Dec. 22, 1931.  R. E. JENKINSON  1,838,057

STITCHER DISK

Filed April 4, 1928

INVENTOR
Ross E. Jenkinson
BY
ATTORNEY

Patented Dec. 22, 1931

1,838,057

UNITED STATES PATENT OFFICE

ROSS E. JENKINSON, OF AKRON, OHIO, ASSIGNOR TO THE GOODYEAR TIRE & RUBBER COMPANY, OF AKRON, OHIO, A CORPORATION OF OHIO

STITCHER DISK

Application filed April 4, 1928. Serial No. 267,390.

My invention relates to devices for building pneumatic tires and it has particular relation to a device adapted to facilitate the assembling of the plies of so-called "flat built" tire carcasses.

The object of the invention is to provide a stitching disk so formed and mounted as to include a plurality of different portions adapted to serve the purpose of stitching different portions of a tire carcass.

Pneumatic tires built according to the "flat-built" method are fabricated by superposing and stitching together a plurality of flat bands or plies of rubberized fabric upon a rotatable cylindrical mandrel and by applying annular beads and tread elements thereto. After the plies have been stitched together in cylindrical form, they are removed from the mandrel and placed over an expanding core. The latter is then so expanded by bulging out the tread portion of the tire as to shape it into toroidal form.

Heretofore, it has been customary to stitch the plies of the carcass together by applying a rotatable disk having a single edge upon the periphery of the carcass as the mandrel rotates. While the edge of such a disk is suitable for stitching certain portions of the tire, it is not very well adapted for skiving or feathering off the edges of the tread band adjacent the bead. It is also poorly adapted for stitching about the bead, due to the irregular contour of the latter.

My improved stitching disk is provided with a plurality of stitching edges which overcome the disadvantages of the previously known type of disks.

For a better understanding of my invention, reference may now be had to the accompanying drawings, forming a part of this specification, of which;

Figure 1:
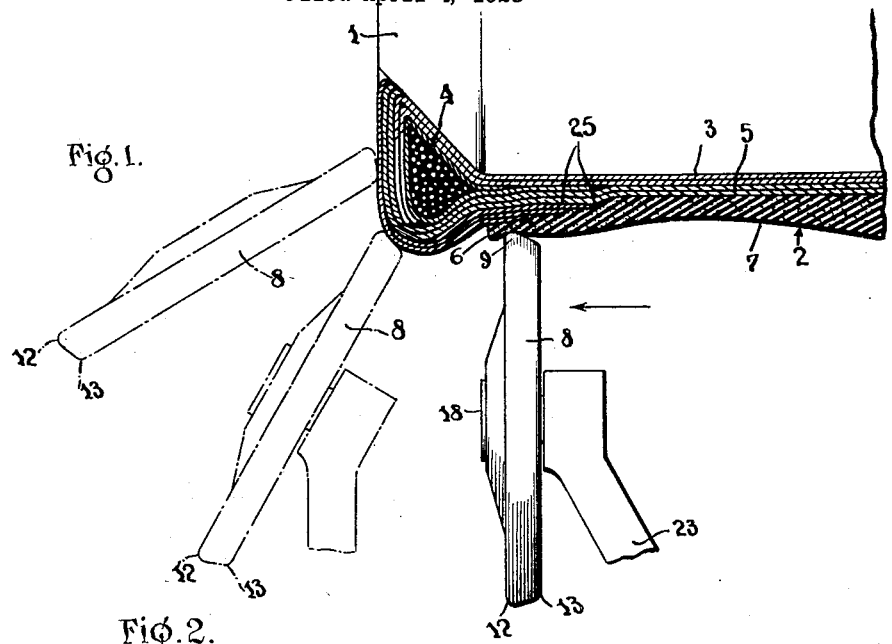
Figure 1 is a fragmentary plan view of a portion of a stitching device and a portion of a cylindrical drum having a tire carcass shown in cross-section built thereon.
Figure 2:
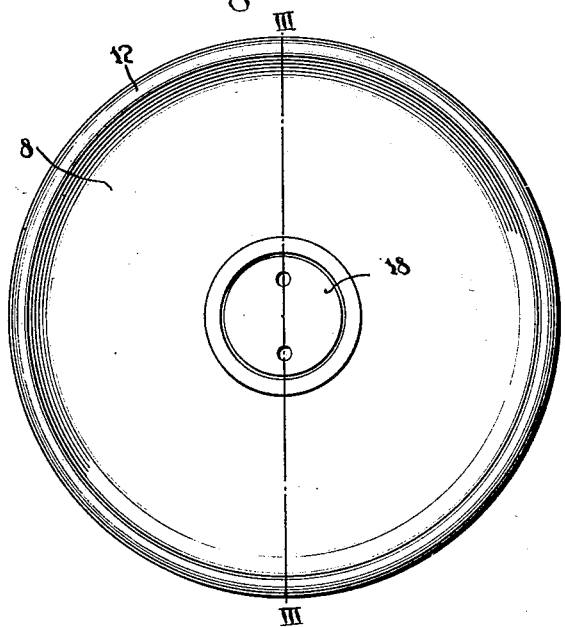
Figure 2 is a front elevational view of a disk embodying my invention.

Referring to the drawings in detail, a rotatable cylindrical drum or core 1 is shown, on which a tire 2 is built, the drum being a part of a conventional tire building machine. The tire is composed of a number of plies of rubberized fabric 3, the edge portions of which are looped about conventional bead elements 4.

A plurality of outer plies of fabric 5 are stitched in superposed relation upon the inner plies 3. The latter plies have their edges turned radially inwardly over the heel portion of the bead 4, and are stitched to the portion of the latter which forms the inner circumferential portion of the finished tire. A tread 7 composed of unvulcanized rubber is superposed upon the outer fabric plies 5, and has a relatively thick edge 6 which must be skived down to a feather edge.

Figure 3:
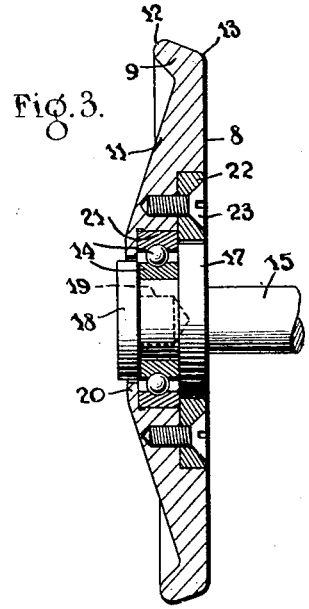
Figure 3 is a cross-sectional view, taken substantially along the line III—III of Figure 2.

My improved stitcher disk is so shaped as to be particularly well adapted for skiving off the edge of the tread 7, and for stitching down the fabric plies 5, over the irregular contour of the bead. This advantage is secured by providing a disk 8 having a lip or flange 9, turned at an angle to a central portion 11 thereof. The disk thus formed is frusto-conical in shape. As best shown by Figure 3 of the drawings, the disk has a rounded stitching edge 12 that is disposed at the outer extremity of the lip 9, and a second stitching edge 13 at the corner of the disk constituting the shorter circumferential portion of the frusto-conical contour.

The disk 8 is journalled by ball bearings 14, upon a shaft 15 that is provided with a collar 17, and a flanged screw 18 that is screwed into an opening 19 in the end of the shaft. The screw 18 and the collar 17 define an annular groove that prevents the ball bearing elements 14 from slipping from the shaft. The disk and ball races are held in operative position in the disk by a flange 20 at the outer edge of a central opening 21, and by a ring 22 which is countersunk and secured by screws 23 into the rear face of the disk.

The shaft 15 of the stitching disk is secured to a movable stitcher arm 23 which is actuated toward and away from the cylinder 1 in a conventional manner.

Figure 4:
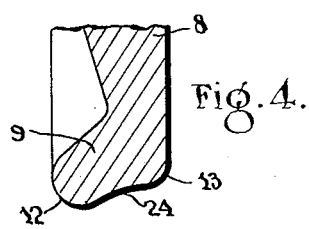
Figure 4 is a fragmentary cross-sectional view, on a larger scale, illustrating another form of disk embodying my invention.

The form of the invention shown by Figure 4 includes a construction in which the periphery of the disk 8 between the stitching edges 12 and 13 is machined into concave form, as indicated at 24. This construction is advantageous when the disk is being used to stitch over the convex portions of the bead 4.

The manner in which my improved disk functions is best understood by reference to Figure 1. While stitching the tread 7 about the looped edges of the carcass plies indicated at 25, the disk is held substantially perpendicularly to the axis of the drum 1. In this position an ordinary stitcher disk exerts a direct pressure upon the tread. Such pressure is not very effective in skiving oy the material along the edges 6 of the tread band. When my improved stitched disk is used the periphery of the lip 9 engages the tread, and is disposed at an acute angle thereto, so that the force exerted tends to be more nearly parallel to the surface than is the case where ordinary disks are used. This force spreads the rubber at the edge of the tread toward the bead, and thus tends to skive it off to a feather edge. As the disk travels toward the edge of the drum 1, it engages the band 4, and the portion of the periphery between the front and rear stitching edges 12 and 13 rides over the convex portion of the bead. This provides a relatively wide area of contact between the bead and the disk, which is advantageous when stitching down the fabric. As the disk travels over the plane portion of the bead, the rear edge 13 performs the stitching operation. This edge is rounded off to such curvature as will function best for stitching this particular part of the tire.

Although I have illustrated only the preferred forms which the invention may assume and have described those forms in detail, it will be apparent to those skilled in the art that the invention is not so limited but that various modifications and changes may be made therein without departing from the spirit of the invention or from the scope of the appended claims.

What I claim is:

1. A unitary stitcher disk for tire building machines, said disk having a frusto-conical periphery, both edges of the frusto-conical configuration being rounded to provide a plurality of stitching surfaces, and being adapted for stitching different parts of a tire carcass, the portion of the periphery between said edges being hollowed out to provide a concave line of contact between the tire and the disk.

2. In combination, a tire building drum, a unitary stitcher disk adapted to play over the surface of the drum, said disk having a frusto-conical periphery, the larger base of which is so disposed as to be directed outwardly from the median plane of the tire drum.

In witness whereof, I have hereunto signed my name.

Signed at Akron, in the county of Summit and State of Ohio, U. S. A., this 3rd day of April, 1928.

ROSS E. JENKINSON.